(12) United States Patent
Paskell et al.

(10) Patent No.: US 12,715,132 B2
(45) Date of Patent: Aug. 25, 2026

(54) AUTOMOTIVE PARTS DEPLOYMENT SYSTEM

(71) Applicant: Ford Global Technologies, LLC, Dearborn, MI (US)

(72) Inventors: Kerry Lance Paskell, Detroit, MI (US); Jason Michael Moore, Clinton Township, MI (US); Alex Turkai, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 740 days.

(21) Appl. No.: 17/108,489

(22) Filed: Dec. 1, 2020

(65) Prior Publication Data

US 2022/0168894 A1 Jun. 2, 2022

(51) Int. Cl.

| | |
|---|---|
| ***B25J 9/00*** | (2006.01) |
| ***B25J 9/16*** | (2006.01) |
| ***G05D 1/00*** | (2024.01) |

(52) U.S. Cl.

CPC ........... *B25J 9/1669* (2013.01); *B25J 9/1687* (2013.01); *G05D 1/028* (2013.01); *G05D 1/0291* (2013.01)

(58) Field of Classification Search

CPC ..... B25J 9/1669; B25J 9/1687; G05D 1/0291; G05D 2201/0216

See application file for complete search history.

(56) References Cited

U.S. PATENT DOCUMENTS

| | | | | |
|---|---|---|---|---|
| 8,620,467 | B2 * | 12/2013 | Wallace | B23P 21/002 700/20 |
| 10,265,871 | B2 * | 4/2019 | Hance | G06K 19/06037 |
| 2018/0339456 | A1 | 11/2018 | Czinger et al. | |
| 2019/0241322 | A1 * | 8/2019 | Blomberg | B65D 50/04 |
| 2020/0192337 | A1 * | 6/2020 | Hoffman | G06Q 10/20 |

FOREIGN PATENT DOCUMENTS

| | | |
|---|---|---|
| CN | 103778522 | 5/2014 |
| CN | 108520270 | 9/2018 |
| EP | 3579174 | 12/2019 |

OTHER PUBLICATIONS

Gesing, et al., Artificial Intelligence in Logistics, collaborative report pp. 1-45, DHL Customer Solutions & Innovation, 2018.

* cited by examiner

*Primary Examiner* — Aaron G Cain
(74) *Attorney, Agent, or Firm* — Burris Law, PLLC

(57) ABSTRACT

An automatic parts delivery system includes a controller, fleets of robots, an autonomous storage-retrieval system and workstations. The controller monitors inventory state of automotive parts during a selected block of time and identifies unavailability of parts for manufacturing a selected vehicle model. The controller determines whether remaining parts can be used to manufacture another vehicle model. The fleets of robots scan, deliver and sort parts and prepare a custom kit including at least the remaining parts. The custom kit is delivered to produce another vehicle model at the workstations for producing the selected vehicle model or another vehicle model.

20 Claims, 11 Drawing Sheets

AUTOMOTIVE PARTS DEPLOYMENT SYSTEM

FIELD

The present disclosure relates to an automotive parts deployment system.

BACKGROUND

The statements in this section merely provide background information related to the present disclosure and may not constitute prior art.

Vehicles consume multiple components large and small. A large number of automotive components is used in a vehicle, for instance, 30,000 or more. If a supply of components may be out of sequence, a plant carrying the traditional sequencing throughout the entire manufacturing scheme may be affected. For instance, when some parts for a particular vehicle model are unavailable or missing, workstations assigned to the particular vehicle model may suspend their operations and human and robot operators stop performing tasks until those parts become available. Such suspension of tasks may result in significant production inefficiencies. These and other issues related to manufacturing vehicles are addressed by the present disclosure.

SUMMARY

This section provides a general summary of the disclosure and is not a comprehensive disclosure of its full scope or all of its features.

In one form, an automotive parts deployment system includes one or more fleets of mobile robots, one or more workstations, an autonomous storage-retrieval system, and a controller. The fleets of mobile robots includes a first group of mobile robots and a second group of mobile robots. The workstations are spaced apart from one another, and each workstation is configured to manufacture a selected vehicle model and one or more variants of the selected vehicle model based on predetermined automotive production sequences. The predetermined production sequences include a first sequence associated with a first vehicle model and a second sequence associated with a second vehicle model. The autonomous storage-retrieval system is operatively connected to the workstations via the fleets of mobile robots and storing a plurality of containers to hold parts to be used for manufacturing vehicles. The controller is communicatively coupled to the fleets of mobile robots, the workstations, and the autonomous storage-retrieval system. The controller is configured to: (i) during a selected block of time, identify an inventory state of automotive parts present in the storage-retrieval system and in transit; (ii) determine whether a part is unavailable in a first parts kit associated with the first sequence based on the inventory state of the automotive parts; (iii) determine whether to perform the second sequence with the first parts kit in response to the part being unavailable; (iv) transmit an on-demand request for the first parts kit in response to determining that the second sequence can be performed with the first parts kit; (v) control the first group of mobile robots to prepare a custom kit including the first parts kit and associated with the second vehicle model; and (vi) control the second group of mobile robots to deliver the custom kit to assemble the second vehicle model at the workstations adapted to manufacture the first vehicle model, the second vehicle model, or both.

In at least one variant, the automotive parts deployment system further includes the one or more fleets of mobile robots further comprises a third group of mobile robots each having a scanner. The controller is further configured to control the third group of mobile robots to scan the automotive parts, the containers that hold the parts, or both and determine the inventory state of the parts via the scanning and radio frequency transmission from one or more containers.

In another variant, each container for the automotive parts includes a built-in tracking and traceability chip, and one or more containers from among the plurality of containers include mixed parts that are out of sequence. The fleets of mobile robots further includes a fourth group of mobile robots, and the containers are stackable and removable by the fourth group of mobile robots one or more at a time. The storage-retrieval system is configured to transport and release a selected container among the plurality of containers housed therein in response to the on-demand request.

In yet another variant, the automotive parts deployment system further includes a sorter structure coupled to the storage-retrieval system via a conveyor structure and comprising a plurality of pallets configured to house parts that have been sorted. The controller is further configured to control a fifth group of mobile robots to pick a selected part from the selected container released from the storage-retrieval system and place the selected part in the sorter structure. The controller is further configured to control the first group of mobile robots to prepare the custom kit including the parts that have been sorted in one or more pallets of the sorter structure.

In some forms, a method of deploying automotive parts in a manufacturing facility includes capturing identification information of automotive parts, storing containers for the automotive parts in a storage-retrieval system, and during a selected block of time, identifying an inventory state of the automotive parts present in the storage-retrieval system and in transit. The method further includes retrieving a plurality of production sequences including a first sequence associated with a first vehicle model and a second sequence associated with a second vehicle model into a storage, based on the inventory state, determining whether a part is unavailable in a first parts kit associated with the first sequence, determining whether to perform the second sequence with the first parts kit in response to the part being unavailable, transmitting an on-demand request for the first parts kits in response to determining that the second sequence can be performed with the first parts kit, controlling a first group of mobile robots to prepare a custom kit including the first parts kit and associated with the second vehicle model, and delivering, with a second group of mobile robots, the custom kit to assemble the second vehicle model at one or more of a plurality of workstation. Each workstation is configured to manufacture a selected vehicle model and one or more variants of the selected vehicle model and adapted to manufacture the first vehicle model, the second vehicle model, or both.

In at least one variant, the method of deploying automotive parts further includes updating, substantially in real time, the inventory state of the automotive parts during the selected block of time as one or more of the automotive parts are being consumed.

In another variant, the method of deploying automotive parts further include stacking the containers for the automotive parts in layers, transporting stacked layers of the containers for the automotive parts to the storage-retrieval system, and unstacking each layer from the stacked layers of the containers by a third group of mobile robots one or more at a time. The method of deploying automotive parts further includes releasing the first parts kit from the storage-retrieval system in response to the on-demand request. The step of controlling the first group of mobile robots to prepare the custom kit further includes controlling the first group of mobile robots to pick a selected part from the first parts kit released from the storage-retrieval system, place the selected part in a sorter structure, and prepare the custom kit in response to the on-demand request and the second sequence.

In yet another variant, the method of deploying automotive parts further includes scanning a built-in tracking-traceability chip provided in each of a plurality of containers with the third group of mobile robots. The method further includes placing, in a single container, mixed parts that are out of sequence. An artificial intelligence trained controller determines whether to perform the second sequence. The plurality of production sequences further includes a third sequence associated with a third vehicle model, and the method further comprises determining whether to deploy operators originally assigned to a workstation for manufacturing the first vehicle model to a workstation for manufacturing the third vehicle model.

In other forms, an automotive parts deployment method includes capturing identification information of containers for automotive parts, storing a plurality of production sequences including a first sequence associated with a first vehicle model and a second sequence associated with a second vehicle model into a memory, during a selected block of time, identifying an inventory state of the automotive parts in a storage-retrieval system and in transit; determining whether a part is unavailable in a first kit associated with the first sequence based on the inventory state of the automotive parts, determining whether to perform the second sequence with the first kit during the selected block of time in response to the part being unavailable, in response to determining that the second sequence can be performed with the first kit, controlling a first group of mobile robots to assemble a custom package including the first kit and associated with the second vehicle model, and delivering the first kit to assemble the second vehicle model at one or more of workstations. Each workstation is configured to manufacture a selected vehicle model and one or more variants of the selected vehicle model and adapted to manufacture the first vehicle model, the second vehicle model, or both.

In at least one variant, the automotive parts deployment method further includes scanning a built-in tracking and traceability chip of each container, transporting a stack of containers to the storage-retrieval system, and unstacking each container from the stack of containers, one or more at a time, and storing each container in the storage-retrieval system in a single layer. The automotive parts deployment method further includes, based on the determination to perform the second sequence with the first kit, transmitting an on-demand request for the first kit to the storage-retrieval system. The automotive parts deployment method further includes sorting, with a second group of mobile robots, the automotive parts present in the containers based on a part type, a size, a weight, a finish type, or a combination thereof. The automotive parts deployment method includes, based on the determination to perform the second sequence with the first kit, re-routing workstations for manufacturing the first vehicle model, the second vehicle model, or both to different locations.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
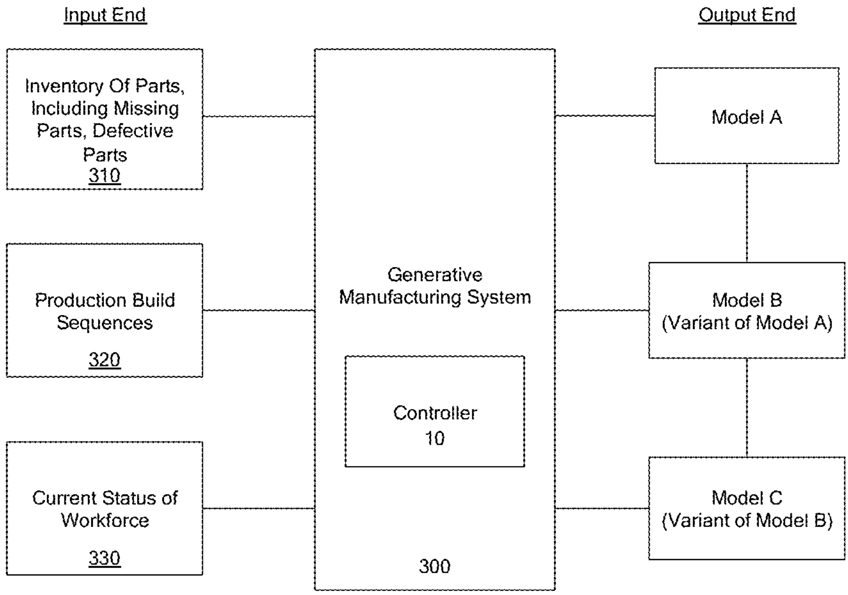
FIG. 1A is a block diagram of a generative manufacturing system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A flexible manufacturing approach for switching between different models is desirable to meet consumer demand in the automotive industry. Specifically, a particular vehicle model may have one or more variant models that share several factors such as a size, a type (a sedan, a pick-up truck, a SUV, etc.), a design, and the like. This flexible approach may enable automakers to share or use parts associated with one model for another model even if all the parts that are in sequence are not available. Accordingly, this flexible approach may reduce parts driven downtime by shuffling and rearranging workstations, operators (human and/or robot), and parts to be used across vehicle models. According to the teachings of the present disclosure, a generative manufacturing system implements a flexible manufacturing approach in the automotive field. The generative manufacturing system involves an iterative process that generates a certain number of outputs that meet certain constraints, and during that process, adjustment, modification, and/or of fine tuning of variables between the constraints and the outputs are made. In the automotive field, options for manufacturing certain models with given constraints can be iteratively determined over time with the generative manufacturing system.

Referring to FIG. 1A, a block diagram of a generative manufacturing system 300 according to the teachings of the present disclosure is provided. The generative manufacturing system 300 includes a controller 10 and, in some forms, the controller 10 includes an artificial intelligence program that iteratively evaluates and adjusts manufacturing options based on constraints and outputs.

Figure 1B:
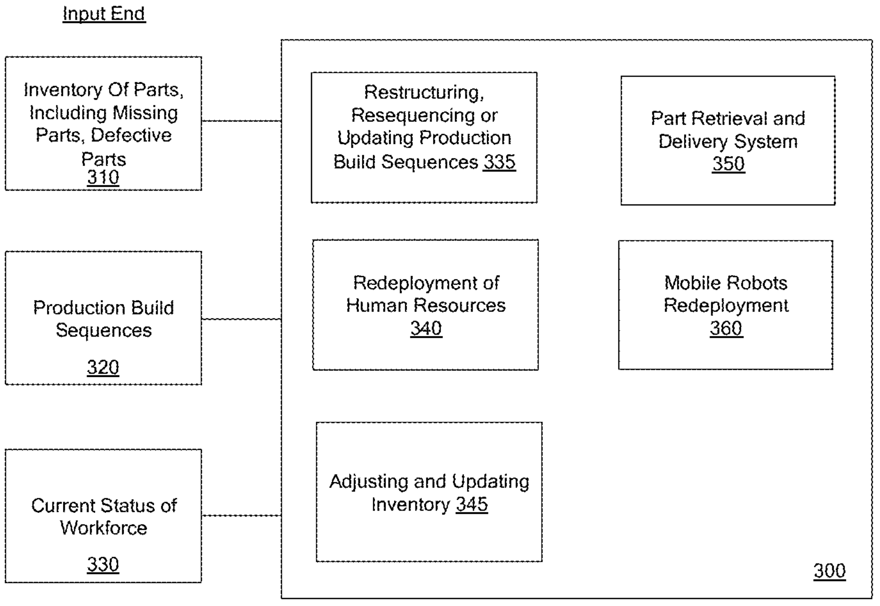
FIG. 1B is another block diagram that illustrates the generative manufacturing system of FIG. 1A.

As shown in FIG. 1A, the generative manufacturing system 300 links an input end representing constraints that can affect the generative manufacturing system 300 and an output end representing manufactured vehicles. As shown in FIGS. 1A and 1B, the constraints may include: inventory of parts 310 such as, but not limited to, missing parts and defective parts; production build sequences 320 that include predetermined sequences associated with different vehicle models (e.g., Model A, Model B, Model C, etc.) and serve as manufacturing manuals; and availability or unavailability of workforce (i.e., current status of workforce 330). These constraints are by way of example only and the present disclosure is not limited thereto.

In one form, the output end represents manufacturing vehicles of Model A, Model B, a variant of Model A, and Model C, and a variant of Model B. Model B is a variant of Model A, and Model A and Model B may have similarity or common features such as a size, a structure, parts to be used, etc. Model C is a variant of model B, and may have common features as well to Model B and possibly, Model A.

FIG. 1B illustrates variables of the generative manufacturing system 300 to be adjustable, fine-tuned, or modifiable with the constraints given at the input end. With the current constraints at the input end, the generative manufacturing system 300 iteratively evaluates the constraints, in light of the expected or preset output, such as manufacturing Model A, Model B, and Model C vehicles as shown in FIG. 1A. In some forms, the generative manufacturing system 300 can make adjustments including modifying the production building sequences 335, redeployment of human resources 340, adjusting and updating inventory of parts 345, adjusting part retrieval and delivery system 350, and/or mobile robots redeployment 360. These adjustments are by way of example only and the present disclosure is not limited thereto.

Figure 1C:
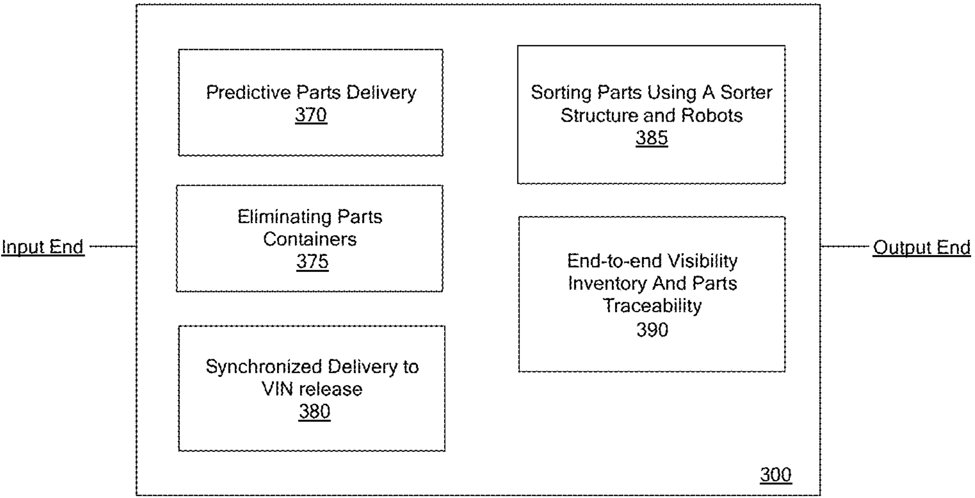
FIG. 1C is further another block diagram that illustrates the generative manufacturing system of FIG. 1A.

In other forms, the generative manufacturing system 300 makes various adjustments as shown in FIG. 1C. For instance, the adjustments include autonomous robotic delivery synched with a production mobile platform or workstation such that robot operators are assigned and synched with one or more mobile platforms. The adjustment may further include: predictive parts delivery 370 in which parts can be added to inventory ahead of a production schedule; eliminating parts containers 375 in workstation may improve production efficiency because a process of removing or opening containers can be omitted; and synchronized delivery to vehicle identification number (VIN) release 380 may enable parts to be available for other vehicles that can be potentially built, regardless of a VIN. The generative manufacturing system 300 may also reduce, to near-zero, human delivery errors and delivery of 'ready to use parts' without requiring additional procedures.

In some forms, the generative manufacturing system 300 runs AI-enabled programs to control an autonomous storage system and read and react to schedule and inventory. In at least one variant, the generative manufacturing system 300 sorts parts using a sorter structure 385 in the E-commerce manner such that sorting can be directly synced to delivery processes. In another variant, the generative manufacturing system 300 tracks parts and materials to provide end-to-end visible inventory and parts traceability 390 and maintain digital twin data threads for parts and materials.

In some forms, the generative manufacturing system 300 may operate as an integral component of an automotive manufacturing ecosystem that manages autonomous delivery of parts and materials, traffic of parts, operators, and workstations, storage of parts, relevant data, information and production schedules, schedules of production and inventory changes. The generative manufacturing system 300 takes a flexible approach to maximize production efficiency and reduce a bottle neck type of downtime in which one small constraint can lead to suspension or delay of the entire production schedules until and unless the small constraint is resolved or addressed.

The generative manufacturing system 300 makes adjustment in consideration of the constraints at the input end and the expected output at the output end. This adjustment resolves or responds to the constraints that delay or hinders production schedules. In addition, the generative manufacturing 300 enables flexible scheduling and quick implementation of schedule changes. The generative manufacturing system 300 may operate by decoupling parts from supply chains and eliminating material and/or parts sequencing. Decoupling parts from predetermined sequences and desequencing parts may enable flexible deployment of parts at manufacturing sites and prevent parts unavailability from becoming a bottle neck of the entire production schedules relevant to unavailable parts. This will likely significantly reduce downtime driven by unavailability of parts. The resultant savings and production efficiency may accompany benefits such as redeploying human and robot operators rather than suspending tasks, producing variant vehicles even if key parts of a particular vehicle may be missing rather than suspending productions of vehicles, among others.

Figure 2:
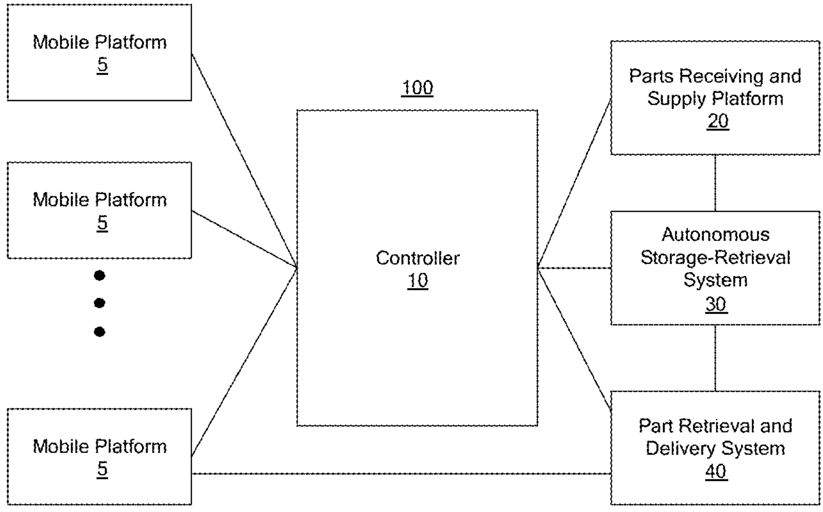
FIG. 2 is a block diagram of automotive parts deployment system according to the teachings of the present disclosure.

FIG. 2 is a block diagram of automotive parts deployment system 100 according to the teachings of the present disclosure. In some forms, the automotive parts deployment system 100 is implemented with and operates as a generative manufacturing system as described in connection with FIGS. 1A through 1C. The automotive parts deployment system 100 adjusts parts deployment with respect to an input constraint such as unavailability of parts for manufacturing a particular vehicle model.

As shown in FIG. 2, the automotive parts deployment system 100 includes a plurality of mobile platforms 5, a parts receiving-supply platform 20, an autonomous storage-retrieval system 30, and a part retrieval-delivery system 40. The automotive parts deployment system 100 includes a controller 10 that is communicatively coupled with the mobile platforms 5, the parts receiving-supply platform 20, the autonomous storage-retrieval system 30, and the part retrieval-delivery system 40.

Figure 5:
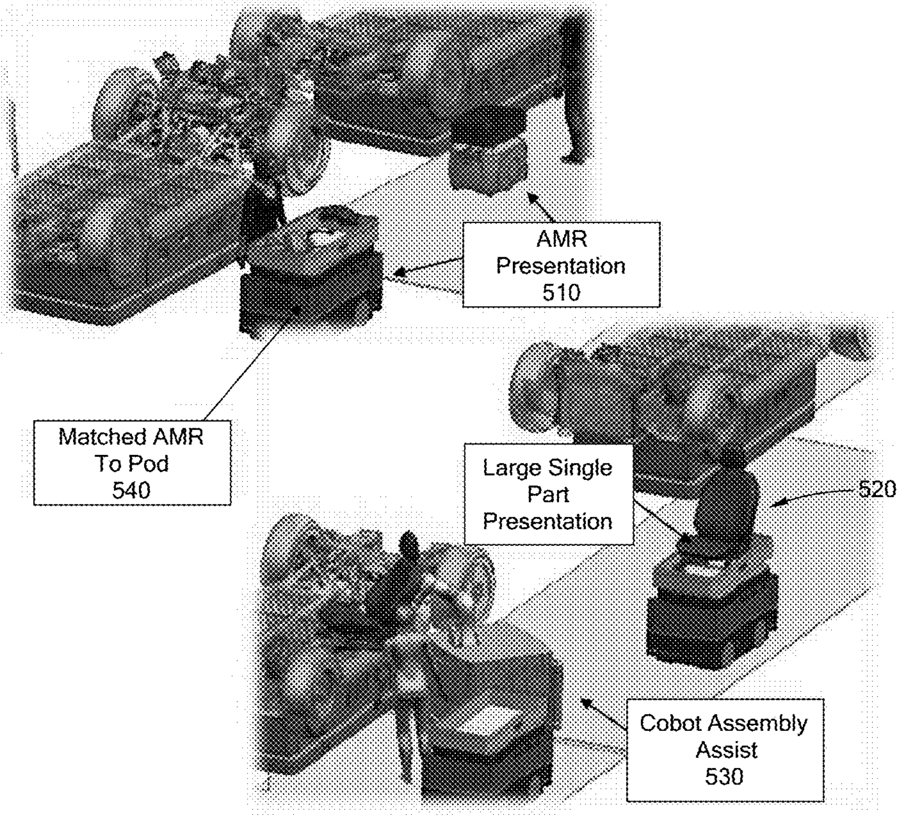
FIG. 5 is a perspective view of one form of workstations and mobile robots.

At the mobile platforms 5, human and/or robot operators assemble parts and produce vehicles as shown in FIG. 5. In some forms, the mobile platforms 5 are used as workstations to produce Model A, or Model B which is a variant of Model A. In other forms, the mobile platforms 5 are used to produce both Model A and Model C. In that case, Model A and Model C may have common features that can be produced at the same mobile station.

Figure 4:
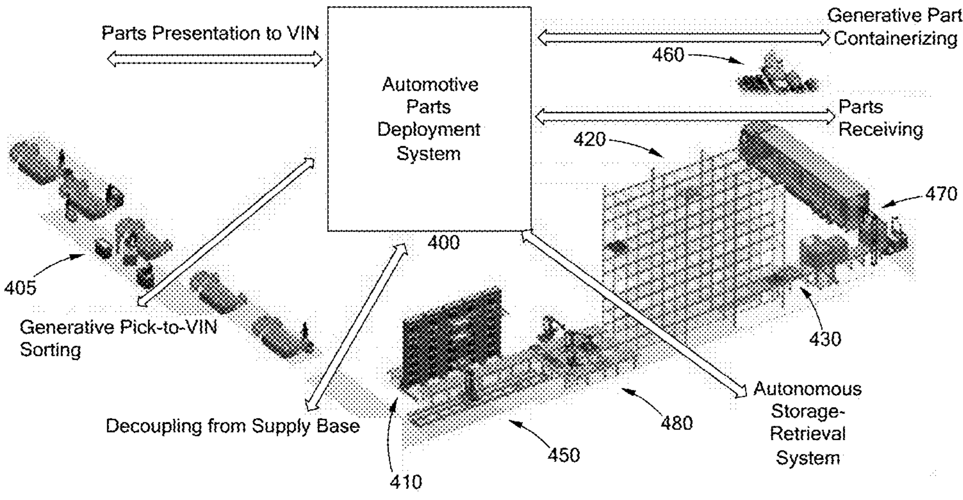
FIG. 4 is a perspective view of one form of the automotive parts deployment system of FIGS. 2 and 3.

The parts receiving-supply platform 20 includes a group of mobile robots and a conveyor structure for transporting parts. As shown in FIG. 4, parts from suppliers arrive at a manufacturing site and are received by the group of mobile robots (see area 470). Additionally, human operators may receive parts as needed and parts are unloaded and scanned by the mobile robots. In some forms, parts are delivered in containers and the mobile robots scan the containers to identify parts. In at least one variant, the containers include traceability chips that store parts information and scanned information is to be sent to the controller 10. In other forms, the containers have radio transmission functions that transmit parts information via radio frequency transmission.

Referring back to FIG. 4, unloaded containers are transported on a conveyor structure, as shown in areas 430 and 460. In some forms, unloaded containers are transported in multiple layers (see area 430, 470 in FIG. 4) to the autonomous storage-retrieval system ("the ASRS") 30 as shown in FIGS. 3 and 4.

Figure 3:
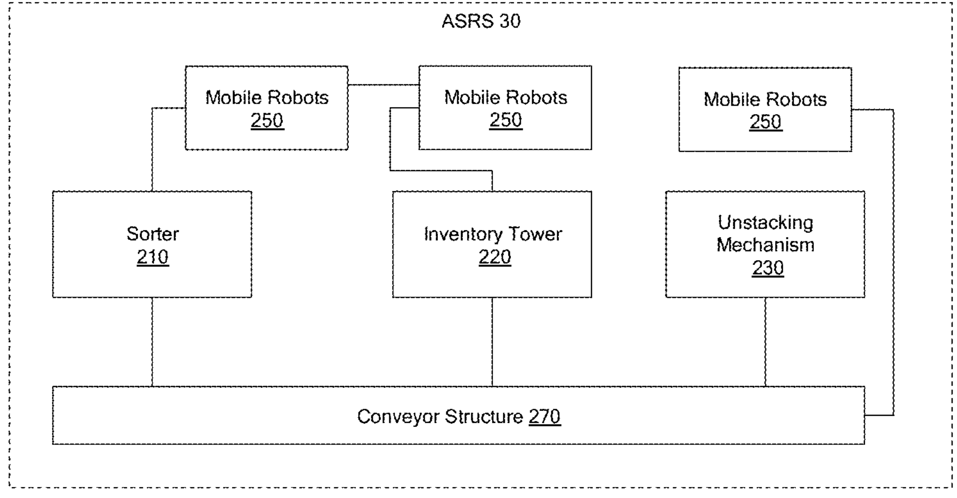
FIG. 3 is a block diagram of an autonomous storage-retrieval system included in the automotive parts deployment system of FIG. 1.

FIG. 3 is an exemplary block diagram of the ASRS 30 included in the automotive parts deployment 100 system of FIG. 2. The ASRS 30 is communicatively coupled to the controller 10 and includes one or more mobile robots 250 and a conveyor structure 270. The ASRS 30 further includes a sorter 210, an inventory tower 220, and an unstacking mechanism 230, which are communicatively coupled to the controller 10. Structures and operations of the ASRS 30 are described in detail in connection with an automotive parts deployment system 400 shown in FIG. 4.

FIG. 4 illustrates a perspective view of one form of the automotive parts deployment system 400 including a sorter 410, an inventory tower 420, and an unstacking mechanism 430. The ASRS 30 and the sorter 210, the inventory tower 220 and the unstacking mechanism 230 shown in FIG. 3 may have common or similar features with the sorter 410, the inventory tower 420, and the unstacking mechanism 430 and other structures in FIG. 4, but the teachings of the present disclosure are not limited thereto. In some forms, the unstacking mechanism 430 is connected to the inventory tower 420 which is in turn connected to the sorter 410. The unstacking mechanism 430 is structured to receive containers transporting parts and separate stacked layers of containers such that each layer of containers is fed into the inventory tower 420. At the unstacking mechanism 430 and at the exit of the inventory tower 420, one or more groups of mobile robot operators perform unstacking tasks.

As shown in FIG. 4, each layer of container is stored in the inventory tower 420. The automotive parts deployment system 400 is configured to track the transport and storage of each layer of container based on the scanned information of the containers. In one variant, if one or more parts are transported without containers, parts can be scanned directly, or transmit radio frequency transmission that is receivable by the controller 10 via an RF receiver.

The parts containers will be released and transported from the inventory tower 420 toward the sorter 410. In some forms, the sorter 410 includes a plurality of pallets, each of which stores one or more parts that have been sorted. Once a selected part container is released from the inventory tower 420, one or more groups of mobile robots 450 pick parts and place them in one or more pallets of the sorter 410. In FIG. 4, one mobile robot 450 and one sorter 410 are illustrated for convenience of description, but the present disclosure is not limited thereto.

Manufacturing a vehicle involves a large number of parts, e.g. 30,000 or more, with complex assembly. The sorter 410 includes a large number of structures that accommodate various automotive parts of different shapes and sizes. In addition, a number of the mobile robots 450 assigned to pick and sort parts can be adjusted as needed. The sorter 410 is the structure that is suitable for placing parts that have been sorted and easily retrievable once parts are in demand/or needed. In other words, the sorter 410 operates to sort parts such that parts can be easily retrieved and delivered to the mobile stations 5 by robot operators.

In some forms, the sorter 410 may operate in a manner that E-commerce sorting works. For example, the sorter 410 controls robot operators to classify parts and place them in storage spaces of the sorter 410 such that each part is easily identifiable, retrievable, and picked up for a next process or tasks. The structures and operations of the automotive parts deployment system as shown in FIG. 4 may be applicable to the automotive parts deployment system 100 and the ASRS 30 as shown in FIGS. 2 and 3.

FIG. 5 illustrates exemplary workstations where vehicles are under production. Human operators and robot operators are deployed at the workstations. In some forms, the robot operators include automatic mobile robots. As shown in FIG. 5, robot operators 510 deliver parts to the workstations. In some forms, parts may be delivered in a custom kit 540. In at least one variant, parts may be delivered as a large single part 520 in a custom container, or a custom pod as shown with 530, 540.

Figure 6A:
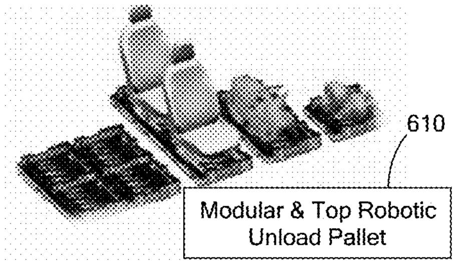
FIG. 6A illustrates one form of a modular container according to the teachings of the present disclosure.
Figure 6B:
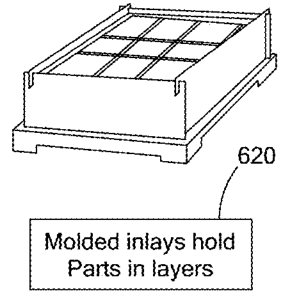
FIG. 6B illustrates another form of a container having mixed inlays according to the teachings of the present disclosure.
Figure 6B:
Figure 6C:
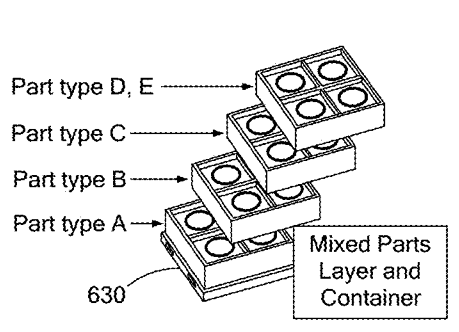
FIG. 6C illustrates mixed parts layer according to the teachings of the present disclosure.
Figure 6D:
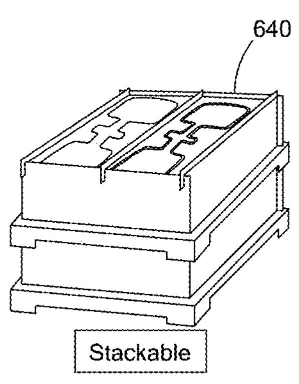
FIG. 6D illustrates one form of stacked containers according to the teachings of the present disclosure.

FIGS. 6A through 6D illustrate several examples of containers that house or transport automotive parts. FIG. 6A illustrates a modular container 610 that loads parts on a top thereof. FIG. 6B illustrates that molded inlays 620 hold parts in layers. FIG. 6C illustrates at least one variant that mixed parts such as Part Types A, B, C, D and E are loaded into one container. These Part Types A, B, C, D and E are not sequenced and also can be unrelated. Mixed parts having no sequencing relationship can be loaded into one container according to the teachings of the present disclosure. The automotive parts deployment system 100 takes a flexible approach to take parts that are not in sequence, shuffle and deploy parts, unlike the conventional approach. FIG. 6D illustrates containers 640 that are stackable.

In some forms, packaging to allow multiple part numbers within the same layer is available according to the teachings of the present disclosure, as represented by referenced number 630 in FIG. 6C. Additionally, or alternatively, unit loading to allow different part numbers in different layers is possible according to the teachings of the present disclosure.

Figure 7:
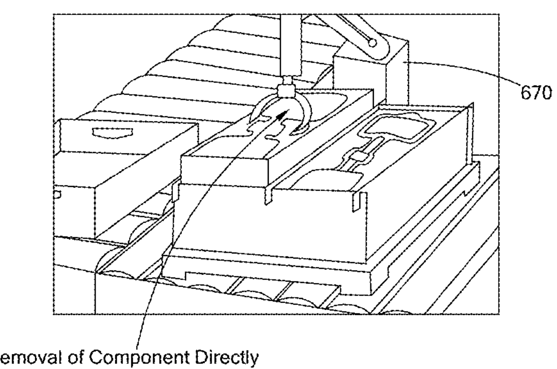
FIG. 7 illustrates removing a part from a container via a robot operator.

FIG. 7 illustrates one form of a container 670 that has an inlay mold 660 where parts are placed in the mold as shown with 660. As shown in FIG. 7, a part of the mobile robot such as a robot arm picks up a part or component directly, or alternatively the entire inlay while the container having parts is in transport on the conveyor structure.

Figure 8:
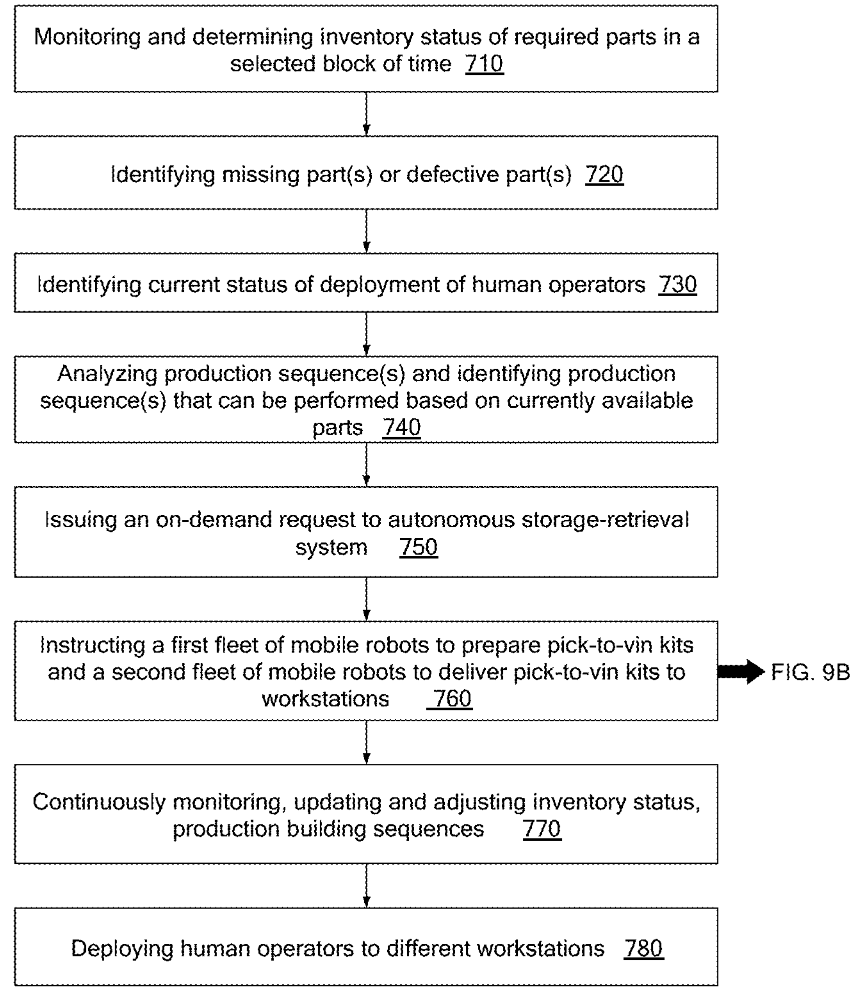
FIG. 8 is a flowchart of an automotive parts deployment method according to the teachings of the present disclosure.

FIG. 8 illustrates a flowchart of an automotive parts deployment method according to the teachings of the present disclosure. In some forms, the automotive parts deployment method is implemented with the automotive parts deployment systems 100, 400 described above in connection with FIGS. 2 through 4. The descriptions to the automotive parts deployment systems 100, 400 can be referred to in describing the automotive parts deployment method.

In FIG. 8, a selected block of time is set where constraints and an output are set (Step 710). In some forms, the selected block of time is a window of time where the constraints are present and the output are set. For instance, the selected block of time includes 3 days where 5,000 vehicles of Model A, Model B and Model C are set to be produced. In some forms, the constraints relate to unavailability of parts in the context of the automotive parts deployment method according to the teachings of the present disclosure. Thus, an inventory status of required parts is monitored and determined during the selected block of time, at step 710. Referring back to FIGS. 2-4, the controller 10 monitors and determines the inventory state of required parts for manufacturing Model A of a vehicle. All received parts are scanned by the mobile robots at the parts receiving-supply platform 20 as shown in FIGS. 2 and 4. Additionally, or alternatively, suppliers may send parts availability information via radio frequency transmission or other forms of transmission while parts are in transit. In another variant, containers and/or parts can transmit information via radio frequency transmission while parts are in transit.

As described above, in some forms, the inventory tower 220, 420 houses each single layer of parts in a container or without a container. The single layer based storage facilitates tracking, updating and release of the stored parts as needed. The ASRS 30 communicates, substantially in real time, with the controller 10 to update and adjust the inventory status of parts. With continuing reference to FIG. 8, at step 720, with respect to the output of building a particular type of vehicle, for example, Model A vehicle, the controller 10 may identify unavailability of parts during the selected block of time. In some example, parts become unavailable because parts are missing, defective, arrival of parts is delayed within the manufacturing site, or on suppliers' end, among other reasons.

At step 730, a current deployment status of human operators may be monitored and identified. For instance, human operators associated with workstations may be identified. At step 740, production sequences associated with Model A, Model B and/or Model C are identified and analyzed. In some forms, production sequences are predetermined and prestored in a memory such that the controller 10 accesses and determines appropriate production sequences for manufacturing a particular vehicle model. The production sequences serve as a production roadmap and instructions in building a particular vehicle model and include parts information and all other relevant information as well.

Once parts required for a selected production sequence are unavailable (e.g., parts for a production sequence for building Model A), the controller 10 retrieves and analyzes production sequences for building other vehicles than Model A, such as a variant of Model A, at step 740. This approach is different from and more flexible than the conventional approach which suspends operations of manufacturing Model A until parts become available. Here the unavailable parts may be essential parts for Model A, such as a battery for an electric vehicle, or alternatively, nonessential parts. Instead of suspending operations based on parts unavailability, the controller 10 recognizes parts unavailability as a constraint and starts iterative processes of making adjustments. In some forms, the controller 10 analyzes the production sequences other than one for Model A and determines whether the rest of parts based on the current inventory state can be used in these production sequences.

In some forms, the controller 10 includes an artificial intelligence program that iteratively evaluates and adjusts the inventory status of parts during the selected block of time in light of the output such as building Model A vehicle. Additionally, the controller 10 has been trained to recognize the inventory status and identify options for handling unavailable part(s) such as applying other production sequences by relevant training data. In some forms, the relevant training data may be correlated to different inventory status lacking one or more parts related to a particular vehicle model. In other forms, the relevant training data may include one or more templates that list common parts for different vehicle models, key parts, non-essential parts, related vehicles (e.g., a vehicle and variants thereof), etc.

The controller 10 identifies one or more production sequences that can use the rest of parts without unavailable parts. Upon identification, the controller 10 issues an on-demand request to the ASRS 30, at 750. In response to the on-demand request for the rest of parts, the parts housed in the ASRS 30 are released and transported from the ASRS 30. Specifically, at step 760, the controller 10 instructs a first fleet of mobile robots to prepare pick-to-yin kits and a second fleet of mobile robots to deliver pick-to-yin kits to workstations. In one form, the pick-to-yin kits are prepared based on the routine of FIG. 9B which is described below.

Once prepared, the second fleet of mobile robots are controlled to deliver custom kits to the workstations for manufacturing the other model vehicle (e.g., Model B or Model C). The controller 10 continuously monitors, updates, and adjusts the inventory status and the production building sequences substantially in real time as parts are being consumed and in transit (represented by step 770). Alternatively or additionally, as the custom kits are delivered to the workstations, human operators are deployed to different workstations, at step 780. For instance, human operators assigned to the workstations for producing Model A may be redeployed to the workstations for Model B, Model C, or both. In another variant, the workstations may be shifted or routed to different locations as needed.

Figure 9A:
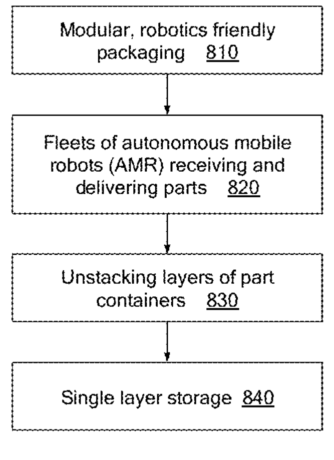
FIG. 9A is a flowchart of transporting parts to storage according to the teachings of the present disclosure.
Figure 9B:
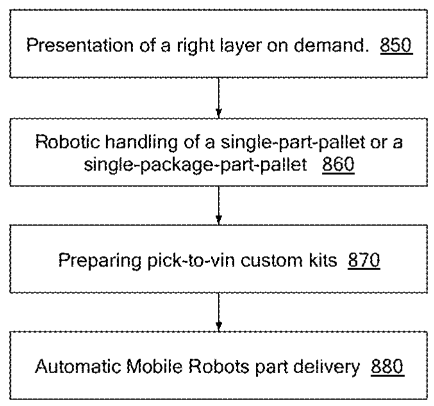
FIG. 9B is a flowchart of transporting parts from storage to workstations according to the teachings of the present disclosure.

FIGS. 9A and 9B are flowcharts that illustrate movement of automotive parts in the automotive production line. Specifically, FIG. 9A provides an exemplary flow of parts being transported to storage and FIG. 9B an exemplary flow of parts being transported from storage to workstations in response to an on-demand request. The following description of FIGS. 9A and 9B is provided in further reference to FIG. 4, which illustrates the perspective view of the automotive production line.

In FIG. 9A, parts from suppliers arrive in modular and robotics friendly packaging, at step 810. Additionally, parts can arrive in considerably smaller batches at high frequencies. Once parts arrive at the manufacturing facilities, fleets of autonomous mobile robots (AMRs) are employed to receive and deliver the parts, at 820. In one form, the AMRs receive parts in containers and such containers are transported on the conveyor structure in a stacked form. When the stacked containers layers arrive at the ASRS, the AMRs unstack the layers of parts containers, at step 830. In some forms, the AMRs pull a lowermost layer of part container and separate the lowermost layer from the rest of stacks. In at least one variant, the AMRs pull one layer at a time, but the AMRs may separate two or more layers at a time. Through the unstacking process of 830, a single layer of part container is transported and stored in the ASRS, at step 840.

Referring to FIG. 9B, as discussed above, one or more parts containers are released from the ASRS if an on-demand request is issued for corresponding parts in the ASRS. Specifically, at step 850, the parts relevant to the on-demand request are released from the ASRS 30 as a single layer per part to the sorter 210. At or near the sorter 210, robot operators are arranged or positioned to handle sorting processes of parts. Specifically, at step 860, robot operators handle parts in a single-part-pallet manner or a single-package-pallet manner as illustrated at 450 of FIG. 4. In some forms, robot operators pick up the released and transported part from the ASRS 30 and place in one pallet of the sorter 410. In other forms, the robot operators pick up the released and transported part from the ASRS 30 in one pallet as a single package. Automotive manufacturing involves a large number of parts and thus, the number of robot operators and the positioning of the robot operators are determined to accommodate the large number of parts for the sorting processes.

Once sorted at the sorter 410, the parts are picked to prepare custom kits that are associated with VINs, at step 870. And, at step, 880, the AMRs are controlled to deliver the custom kits to relevant workstations, as also indicated in step 760 of FIG. 7.

With regard to step 870, a first fleet of mobile robots 760 are controlled to prepare custom kits by picking the parts that have been sorted (illustrated at 480 of FIG. 4). In some forms, the custom kits include available parts during the selected block of time that are associated with Model B, a variant of Model A. In other forms, the custom kits include available parts during the selected block of time that are associated with Model C, a variant of Model B. In at least one variant, the custom kits include all available parts associated with Model A and included in the production sequence of Model A. Additionally, the custom kits may include other parts in view of vehicles to be produced such as Model B, or Model C. Models A, B, and C are described for description purpose only and the present disclosure is not limited to those models.

The automotive parts delivery system and method as described above implement the generative manufacturing system that serves as an enterprise eco-system. The automotive parts delivery system and method perform parts presentation to VIN and syncing of the parts presentation to part delivery pods delivered at the workstations.

The automotive parts delivery system and method as described above involve a generative pick-to-yin sorting process. The pick-to-VIN sorting process deliver parts but no container to the delivery pods.

In the automotive parts delivery system and method as described above, AMRs perform tasks to scan, transport, arrange, rearrange, and deliver parts to the workstations. The automotive parts delivery system and method as described above further control to pause, delay and re-route AMRs upon schedule changes.

The automotive parts delivery system and method as described above manage digital twin threads of parts from supplier to delivery such that tracking, maintaining and updating the inventory state of parts are facilitated.

The automotive parts delivery system and method as described above are structured and configured to decoupling automotive parts from a supply base. Instead of constraining parts in a particular sequence or a predetermined package, the automotive parts delivery system and method as described above take a flexible approach and allow use of parts out of sequence and out of package.

The automotive parts delivery system and method as described above include the ASRS that enables scheduling and material release of all parts needed. The automotive parts delivery system and method as described above enable visible inventory from suppliers to delivery pods at the workstations by the ASRS. The ASRS is run by the AI-enabled program that continuously checks visible inventory and production schedule to adjust inventory.

Adjustments in the ASRS inventory requires an allocated buffer space. One-layer material pallet in the ASRS pallets is presented to pick lanes towards the sorter. Material for a period is stored in ASRS which iteratively calls for more as it is consumed during the period. Required parts in a block of time is continuously and iteratively adjusted as parts are used for production. The production build sequences are based, in part on material in the ASRS and visibility to inventory in transit. Part containers are loaded straight into the ASRS and the part containers layers are de-stacked.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality, such as, but not limited to, movement drivers and systems, transceivers, routers, input/output interface hardware, among others; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

What is claimed is:

1. An automotive parts deployment system comprising:

at least two fleets of mobile robots comprising a first group of mobile robots and a second group of mobile robots;

a plurality of workstations spaced apart from one another, the workstations being configured to manufacture a plurality of vehicles of a first vehicle model according to a first predetermined production sequence and a plurality of vehicles of a second vehicle model according to a second predetermined production sequence;

an autonomous storage-retrieval system operatively connected to the workstations via the at least two fleets of mobile robots and storing a plurality of containers to hold parts to be used for manufacturing the plurality of vehicles of the first vehicle model and the plurality of vehicles of the second vehicle model; and a controller communicatively coupled to the at least two fleets of mobile robots, the workstations, and the autonomous storage-retrieval system, wherein the controller is configured to:

during a selected block of time, identify an inventory state of automotive parts present in the storage-retrieval system and in transit;

determine whether a part is unavailable in a first parts kit associated with the first predetermined production sequence based on the inventory state of the automotive parts;

determine whether to perform the second predetermined production sequence with the first parts kit in response to the part being unavailable;

transmit an on-demand request for the first parts kit in response to determining that the second predetermined production sequence can be performed with the first parts kit;

control the first group of mobile robots to prepare a custom kit including, at least, the first parts kit; and control the second group of mobile robots to deliver the custom kit to a selected workstation from among the plurality of workstations to assemble the plurality of vehicles of the second vehicle model, wherein the first group of mobile robots prepare the custom kit at a location different from the selected workstation; and re-route the plurality of workstations for manufacturing the plurality of vehicles of the second vehicle model according to the second predetermined production sequence.

2. The system of claim 1, wherein:

the one or more fleets of mobile robots further comprises a third group of mobile robots each having a scanner, and the controller is further configured to control the third group of mobile robots to scan the automotive parts, the containers that hold the parts, or both and determine the inventory state of the parts via the scanning and radio frequency transmission from one or more containers.

3. The system of claim 2, wherein each container for the automotive parts includes a built-in tracking and traceability chip, and one or more containers from among the plurality of containers include mixed parts that are out of sequence.

4. The system of claim 2, wherein the at least two fleets of mobile robots further comprise a fourth group of mobile robots, and the containers are stackable and removable by the fourth group of mobile robots one or more at a time.

5. The system of claim 1, wherein the storage-retrieval system is configured to transport and release a selected container among the plurality of containers housed therein in response to the on-demand request.

6. The system of claim 5 further comprising:

a sorter structure coupled to the storage-retrieval system via a conveyor structure and comprising a plurality of pallets configured to house parts that have been sorted; and the controller is further configured to control a fifth group of mobile robots to pick a selected part from the selected container released from the storage-retrieval system and place the selected part in the sorter structure.

7. The system of claim 6, wherein the controller is further configured to control the first group of mobile robots to prepare the custom kit including the parts that have been sorted in one or more pallets of the sorter structure.

8. A method of deploying automotive parts in a manufacturing facility, the method comprising:

preparing a plurality of workstations, the workstations being configured to manufacture a plurality of vehicles of a first vehicle model according to a first predetermined production sequence and a plurality of vehicles of a second vehicle model according to a second predetermined production sequence;

capturing identification information of automotive parts;

storing containers for the automotive parts in a storage-retrieval system;

during a selected block of time, identifying an inventory state of the automotive parts present in the storage-retrieval system and in transit;

retrieving a plurality of predetermined automotive production sequences including the first predetermined production sequence for manufacturing the plurality of vehicles of the first vehicle model and the second predetermined production sequence for manufacturing the plurality of vehicles of the second vehicle model into a storage;

based on the inventory state, determining whether a part is unavailable in a first parts kit associated with the first predetermined production sequence;

determining whether to perform the second predetermined production sequence with the first parts kit in response to the part being unavailable;

transmitting an on-demand request for the first parts kits in response to determining that the second predetermined production sequence can be performed with the first parts kit;

controlling a first group of mobile robots to prepare a custom kit including, at least, the first parts kit; and delivering, with a second group of mobile robots, the custom kit to a selected workstation from among the plurality of workstations to assemble the plurality of vehicles of the second vehicle model, wherein the first group of mobile robots prepare the custom kit at a location different from the selected workstation.

9. The method of claim 8 further comprising updating, substantially in real time, the inventory state of the automotive parts during the selected block of time as one or more of the automotive parts are being consumed.

10. The method of claim 8 further comprising:

stacking the containers for the automotive parts in layers;

transporting stacked layers of the containers for the automotive parts to the storage-retrieval system; and unstacking each layer from the stacked layers of the containers by a third group of mobile robots one or more at a time.

11. The method of claim 8 further comprising:

releasing the first parts kit from the storage-retrieval system in response to the on-demand request, wherein controlling the first group of mobile robots to prepare the custom kit further comprises controlling the first group of mobile robots to:

pick a selected part from the first parts kit released from the storage-retrieval system;

place the selected part in a sorter structure; and prepare the custom kit in response to the on-demand request and the second predetermined production sequence.

12. The method of claim 10 further comprising scanning a built-in tracking-traceability chip provided in each of a plurality of containers with the third group of mobile robots.

13. The method of claim 12 further comprising placing, in a single container, mixed parts that are out of sequence.

14. The method of claim 8, wherein an artificial intelligence trained controller determines whether to perform the second predetermined production sequence.

15. The method of claim 8, wherein the plurality of production sequences further comprises a third predetermined production sequence associated with a third vehicle model, and the method further comprises determining whether to deploy operators originally assigned to a workstation for manufacturing the first vehicle model to a workstation for manufacturing the third vehicle model.

16. An automotive parts deployment method comprising:

preparing a plurality of workstations, the workstations being configured to manufacture a plurality of vehicles of a first vehicle model according a first predetermined production sequence and a plurality of vehicles of a second vehicle model according to a second predetermined production sequence;

capturing identification information of containers for automotive parts;

storing a plurality of predetermined automotive production sequences including the first predetermined production sequence for manufacturing the plurality of vehicles of the first vehicle model and the second predetermined production sequence for manufacturing the plurality of vehicles of the second vehicle model into a memory;

during a selected block of time, identifying an inventory state of the automotive parts in a storage-retrieval system and in transit;

determining whether a part is unavailable in a first kit associated with the first predetermined production sequence based on the inventory state of the automotive parts;

determining whether to perform the second predetermined production sequence with the first kit during the selected block of time in response to the part being unavailable;

in response to determining that the second predetermined production sequence can be performed with the first kit, controlling a first group of mobile robots to assemble a custom package including, at least, the first kit; and delivering the first kit to a selected workstation among the plurality of workstations to assemble the plurality of vehicles of the second vehicle model, wherein the first group of mobile robots assemble the custom package at a location different from the selected workstation.

17. The method of claim 16 further comprising:

scanning a built-in tracking and traceability chip of each container;

transporting a stack of containers to the storage-retrieval system; and unstacking each container from the stack of containers, one or more at a time, and storing each container in the storage-retrieval system in a single layer.

18. The method of claim 16 further comprising, based on the determination to perform the second predetermined production sequence with the first kit, transmitting an on-demand request for the first kit to the storage-retrieval system.

19. The method of claim 16 further comprising sorting, with a second group of mobile robots, the automotive parts present in the containers based on a part type, a size, a weight, a finish type, or a combination thereof.

20. The method of claim 16 further comprising, based on the determination to perform the second predetermined production sequence with the first kit, re-routing workstations for manufacturing the first vehicle model, the second vehicle model, or both to different locations.

* * * * *